United States Patent [19]

Elsdon et al.

[11] Patent Number: 5,718,265

[45] Date of Patent: Feb. 17, 1998

[54] CAP AND SHIELD ASSEMBLY

[75] Inventors: Stanley Robert Elsdon, Islington; Arthur S. Cornford, Mississauga, both of Canada

[73] Assignee: Emco Wheaton Fleet Fueling, Corp., Oakville, Canada

[21] Appl. No.: 393,674

[22] Filed: Feb. 24, 1995

[51] Int. Cl.$^6$ ........................................ F16L 55/10
[52] U.S. Cl. ........................... 138/89; 285/45; 285/901; 292/DIG. 4; 49/507
[58] Field of Search ................................ 285/901, 325, 285/45; 292/DIG. 4; 138/94.5; 49/171, 208, 385, 507

[56] References Cited

U.S. PATENT DOCUMENTS

| | | | |
|---|---|---|---|
| 2,304,995 | 12/1942 | Frankel | 49/171 |
| 3,605,337 | 9/1971 | Rodgers | 285/325 X |
| 4,817,991 | 4/1989 | Frentzel | 285/901 X |
| 5,078,170 | 1/1992 | Henry . | |
| 5,092,080 | 3/1992 | Okeda | 49/507 |
| 5,114,189 | 5/1992 | Nurmi et al. | 285/901 X |
| 5,182,928 | 2/1993 | O'Fearna | 285/901 X |

*Primary Examiner*—Dave W. Arola
*Attorney, Agent, or Firm*—Evenson, McKeown, Edwards & Lenahan P.L.L.C.

[57] ABSTRACT

A cap and shield assembly for a fluid conduit coupler has a shield and a cap hingedly connected to the shield with a shaft having a cross-pin extending therethrough. A cam bushing in the bore of the shield has a cam surface which coacts with the cross-pin to provide a positive closed position for the cap relative to the shield. Preferably, the cam bushing also provides a positive open position. The cap and shield assembly is particularly advantageous for couplers having a dry-break interface because the cap is readily moved between open and closed positions and operators will be more inclined to use the cap after fluid transfer. Shrouds on the cap and the shield coact to protect the coupler interface when the cap is in the closed position thereby protecting the dry-break interface from contamination by road and environmental debris. This is particularly advantageous compared to the dust cap of the prior art which tends not to be used for its intended purpose of protecting the fluid conduit coupler.

25 Claims, 6 Drawing Sheets

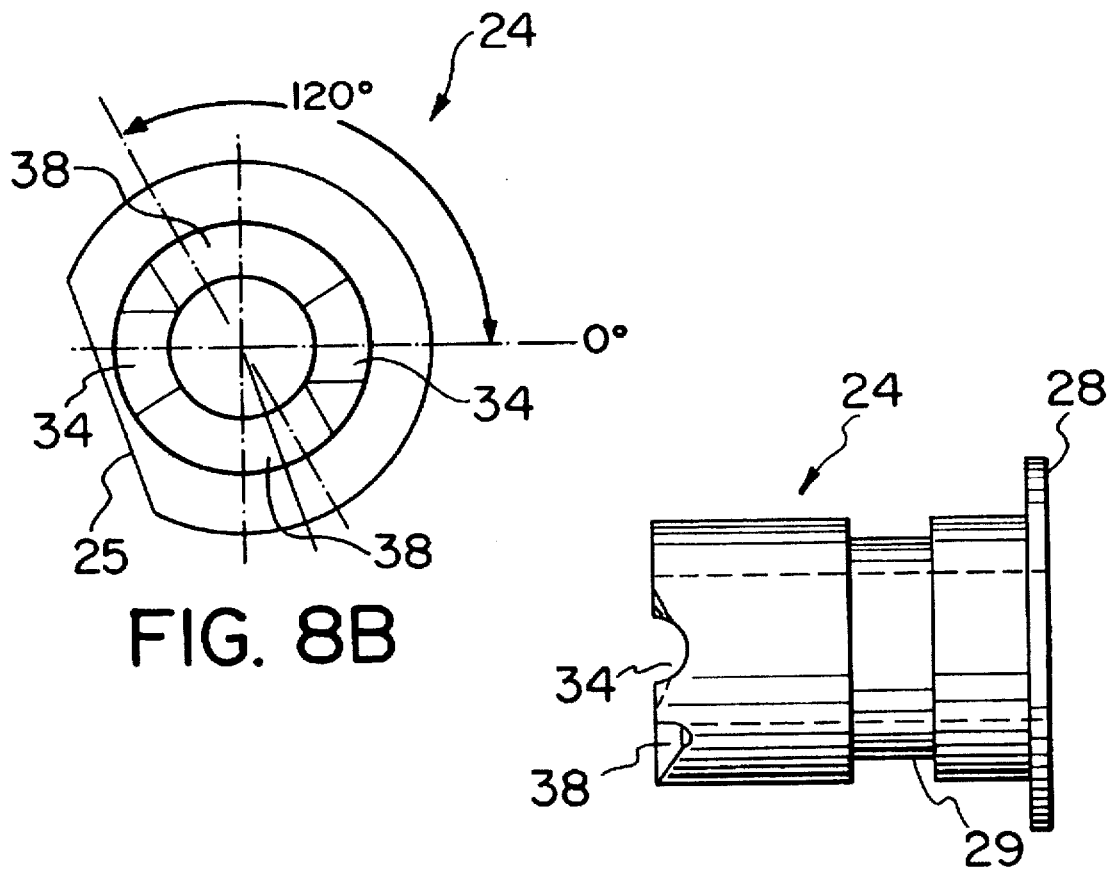
FIG. 8B
FIG. 8A
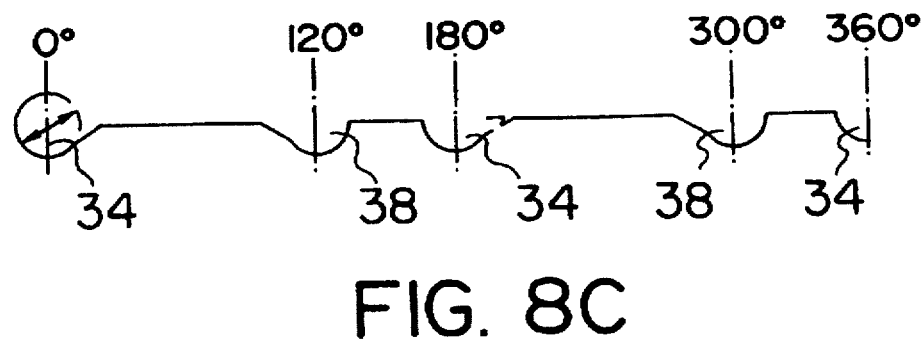
FIG. 8C

CAP AND SHIELD ASSEMBLY

FIELD OF THE INVENTION

The present invention relates to the field of fluid transfer systems and in particular to a cap and shield assembly for a fluid conduit coupler, and more particularly for a coupler having a dry-break interface.

BACKGROUND OF THE INVENTION

Certain fluid conduits and particularly those for transferring flammable or other hazardous fluids, such as fuel, pose potential safety and environmental hazards in the event of leakage from the fluid conduit. For example, in the refuelling of fleet vehicles, such as buses and trucks, it is desirable to deliver fuel at a high flow rate to reduce the time required for refuelling. However, there is a potential safety and environmental hazard if fuel spills from the fuel tank, for example by overflowing, or if fuel escapes from the fuel nozzle when it is not inserted into the fuel tank. There is also a danger that fuel may foam or splash out of the tank during refuelling, especially at high flow rates.

Accordingly, it is recognized that couplers between fluid conduit sections should be capable of coupling and uncoupling while preventing fluid leakage. Such couplers are frequently referred to as "dry-break couplers" and are provided with valves which must be closed before the couplers can be disconnected and which cannot be operated until the couplers are connected. In this way, dry-break couplers inhibit leakage of fluid, for example fuel, from a nozzle and/or a fluid reservoir.

U.S. Pat. No. 5,078,170 (Jan. 7, 1992, Emco Wheaton, Inc.) relates to a coupler for a fluid conduit. The coupler is a dry-break coupler and is specifically constructed so as to be locked in coupled relation when liquid and other fluids flow therethrough. A valve in the coupler must be closed to prevent leakage before uncoupling can be effected. The dry-break mechanism is described in detail in U.S. Pat. No. 5,078,170, the disclosure of which is incorporated herein by reference.

An example of a suitable positive nozzle connector is the POSI/LOCK-105® (Emco Wheaton. Toronto. Canada) automatic fuelling system. The POSI/LOCK-105® system has a nozzle with a bumper ring a popper valve and an interlock plate. In operation, the nozzle is connected to the coupler such that an interface in the coupler engages the interlock plate in the nozzle. The poppet valve of the nozzle is then actuated and a corresponding poppet valve in the dry-break coupler is thus opened. The fuel lever can then be operated and fuel can be transferred to the fuel tank. To disengage the nozzle, the popper lever is released and the dry-break seals in the nozzle and the coupler provide a spill-free disconnection.

It will be appreciated by those skilled in the an that the connection between couplers of the dry-break coupler system is dependent on a good connection between the interface plates of the couplers. It is therefore important that the interface in the coupler be kept free of debris. To this end, the prior art coupler has been provided with a dust cap which is attached by a chain to the coupler assembly, as shown in U.S. Pat. No. 5,078,170. It is not necessary that the dust cap provide a fluid-tight seal since the dry-break interface in the coupler already serves this function. Unfortunately, in the experience of the present applicant, operators find the dust cap inconvenient to use and the dusk caps therefore tend not to be used. The applicant has also found that since the dry-break seal provides a liquid-tight seal, operators are not concerned about fuel leaking from the tank or nozzle and tend not to be concerned with replacing the dust cap over the coupler after refuelling. Furthermore, the chain is prone to breakage so that the dust cap may be lost in transit. In either case, the coupler interface is exposed and is not protected from debris, especially when the vehicle is in transit.

It is an object of the present invention to provide a cap and shield assembly to protect a fluid conduit coupler from debris.

It is another object of the present invention to provide a cap and shield assembly for retrofit to an existing fluid conduit coupler.

SUMMARY OF THE INVENTION

According to one aspect of the present invention, there is provided a cap and shield assembly for a fluid conduit coupler, comprising a shield and a cap hingedly connected to the shield. The shield and the cap are arranged such that when the cap is in a closed position, the fluid conduit coupler is protectively disposed therebetween, and when the cap is rotated from a closed position to an open position, the coupler is exposed. The cap and shield assembly also comprise cam means for positively retaining the cap in the closed position and for moving the cap vertically away from the coupler and the shield when the cap is rotated from the positively closed position to the open position.

According to another aspect of the present invention, there is provided a kit for retrofit to a coupler for a fluid conduit, comprising a shield and a cap adapted to be hingedly connected to the shield. The retrofit fluid conduit coupler is protectively disposed between the shield and the cap when the cap is in a closed position and is exposed when the cap is rotated from a closed position to an open position. The kit also comprises cam means adapted for positively retaining the cap in the closed position and for moving the cap vertically away from the coupler and the shield when the cap is rotated from the positive closed position to the open position.

BRIEF DESCRIPTION OF THE DRAWINGS

In drawings which illustrate embodiments of the present invention,

FIG. 8A is a side elevational view of a cam bushing according to the present invention;

FIG. 8B is a bottom plan view of the cam bushing of FIG. 8A;

FIG. 8C is a cam profile of the cam bushing of FIG. 8A; and

DETAILED DESCRIPTION OF THE PREFERRED EMBODIMENTS

Figure 1:
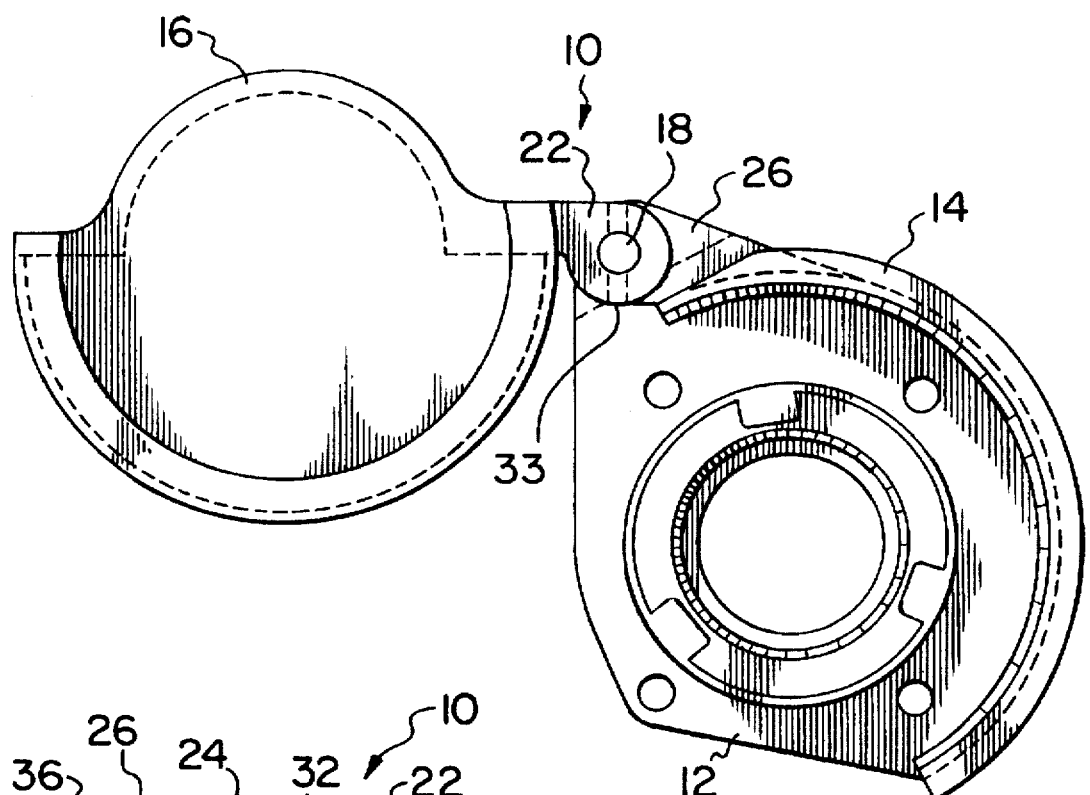
FIG. 1 is a top plan view of one embodiment of a cap and shield assembly of the present invention wherein the cap and shield assembly is shown with a cap in the open position.
Figure 2:
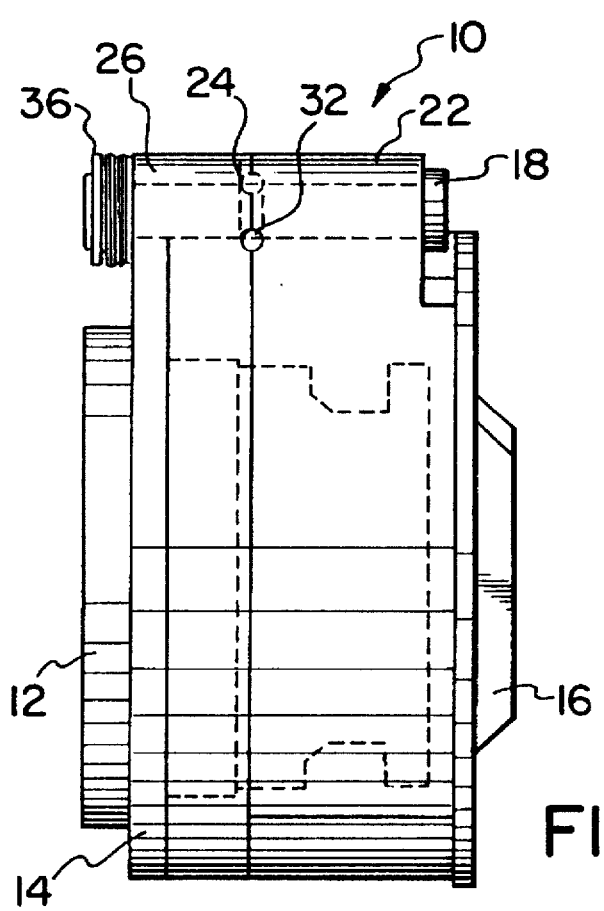
FIG. 2 is a side elevational view of the cap and shield assembly of FIG. 1 with the cap in the positive closed position.

As shown in FIG. 1, a cap and shield assembly 10 for a fluid conduit coupler 12 has a shield 14 and a cap 16. The cap 16 is hingedly connected to the shield 14 so that the cap 16 can be moved between a positive closed position as shown in FIG. 2 and an open position as shown in FIG. 1. In accordance with the present invention, the cap 16 is readily movable from the closed position to the open position and back again so that operators will be inclined to use the cap 16 for its intended purpose of protecting the fluid conduit coupler 12. In the case of a dry-break coupler, the shield 14 and the cap 16 coact to protect the coupler interface (not shown) from debris.

Figure 3:
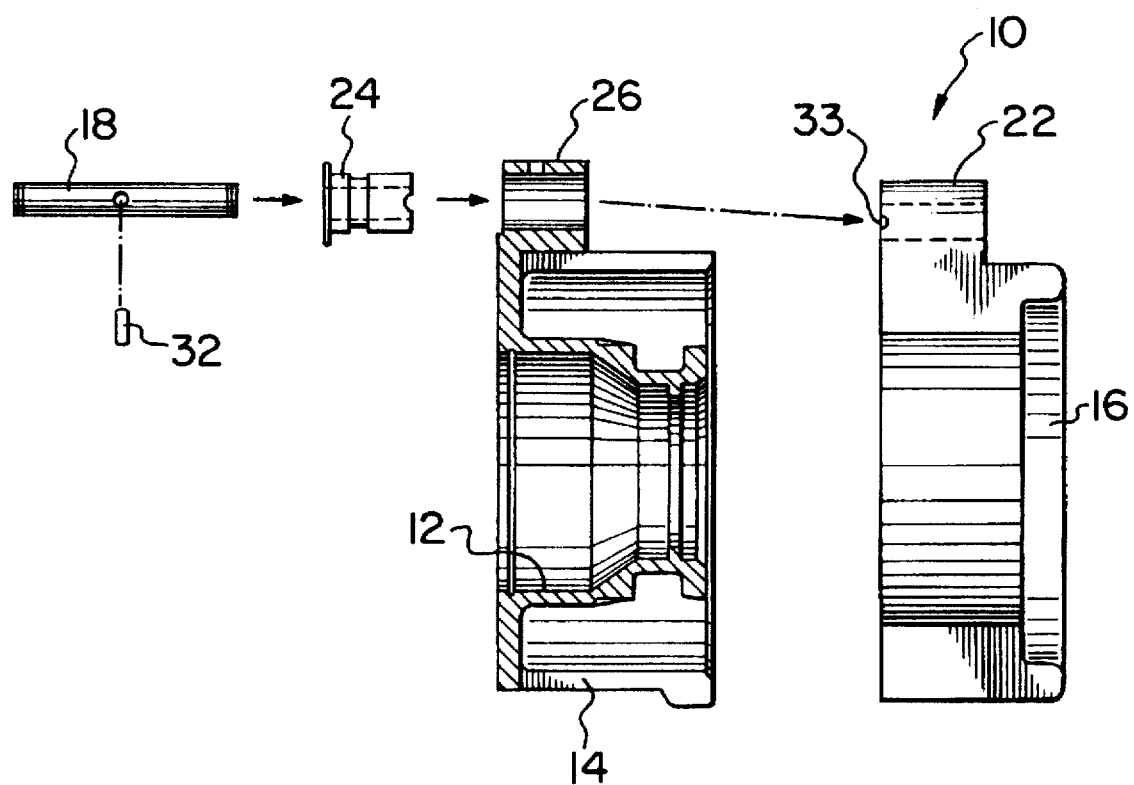
FIG. 3 is an exploded view of the cap and shield assembly of FIG. 1.

As shown more clearly in FIG. 3, the cap 16 and the shield 14 are held in position relative to each other with a shaft 18 which extends through a bore in a boss 22 of the cap 16 and a cam bushing 24 which is disposed in a bore in a boss 26 of the shield 14.

The cam bushing 24 is illustrated in more detail in FIGS. 8A and 8B. One end of the cam bushing 24 has a flange 28 to abut against the shield 14. Preferably, the flange 28 has a flat region 25 to abut against a corresponding flat portion 27 (shown more clearly in FIG. 4) on the shield 14 to rotationally position the cam bushing 24 relative to the shield 14. The other end of the cam bushing 24 has a contoured cam surface. The cam profile of the cam bushing 24 of FIGS. 8A and 8B is illustrated more clearly in FIG. 8C. Preferably, the cam bushing 24 is held in position vertically relative to the shield 14 with a retaining screw (not shown) which extends through a radial bore in the boss 26 into an undercut 29. The shaft 18 is provided with a radial bore to receive a cross-pin 32 (shown more clearly in FIG. 3) which, when the cap 16 is in the closed position, is seated in the cam grooves 34. The facing end surface of the boss 22 of the cap 16 has a retaining groove 33 to engage the cross-pin 32. The shaft 18 is held in position at each end by a retaining device, such as a circlip, and is provided at least at one end with biasing means, such as one or more conical disc spring washers 36 (see FIG. 2) or a coil spring (not shown).

In the embodiment shown in the drawings, the cam bushing 24 is disposed in a bore in the boss 26 of the shield 14. However, it will be appreciated by those skilled in the art that the cam bushing 24 may also be disposed in a bore in the boss 22 of the cap 16.

Furthermore, it will be appreciated by those skilled in the art that the cam action could also be achieved by providing a cam surface on an end surface or in an intermediate groove of either the boss 22 of the cap 16 or the boss 26 of the shield 14. The advantage of using the present arrangement is that the pin 32 and bushing 24 can be made of hard material to reduce wear and to facilitate manufacture by machining, while the cap 16 and shield 14 may be made of less expensive softer materials.

With reference again to FIG. 8C, when the cap 16 is in the closed position (see FIG. 2), the cross-pin 32 is seated in opposing cam grooves 34. When the cap 16 is rotated away from the closed position, the cross-pin 32 follows the contour of the slope of the cam grooves 34 to a flat surface of the cam profile, moving the cap 16 vertically away from the coupler 12 and the shield 14. It will be understood by those skilled in the art that reference to vertical movement is relative to a horizontal plane defined by the base of the shield 14 and does not necessarily refer to the orientation of the cap and shield assembly 10.

Upon further rotation of the cap 16, the cross-pin 32 travels along the flat surface of the cam profile and is urged into opposing cam grooves 38 by the spring washer 36. When the cross-pin 32 is seated in the cam grooves 38, the cap 16 is in a positive open position. Thus, in accordance with the present invention, the cam bushing 24 provides positive open and closed positions for the cap 16 by retaining the cross-pin 32 into the cam grooves 38 and the cam grooves 34, respectively.

In the embodiment shown in FIGS. 8A, 8B and 8C, the cam grooves 34, 38 are separated by an angle of 120° to provide a corresponding 120° angle opening of the cap 16 relative to the shield 14. The size of the angle is not important; however, a 120° angle has been found to provide sufficient room for an operator to manually engage the bumper ring of a nozzle, such as the POSI/LOCK-105®, described hereinbefore. The positive open position of the cap 16, relative to the positive closed position, is preferably at an angle in the range of from about 90° to 180° and more preferably in the range of from about 110° to 130°.

In the embodiment depicted in the drawings, the cam follower is a cross-pin 32 extending through the shaft 18. However, it will be appreciated by those skilled in the art that other cam follower arrangements are possible without departing from the scope of the present invention. For example, a cam pin may extend outwardly from the shaft on only one side thereof. In this case, only one cam groove would be required to lock the cap 16 in the positive closed position.

It will also be appreciated by those skilled in the art that the cam profile may also be changed without departing from the scope of the present invention. For example, there could be only two grooves separated by an angle of 180°. In this case, one end of the cross-pin 32 rests in a first of the two grooves in the positive closed position and sits in the second of the two grooves in the positive open position.

While it is preferable to have both positive open and closed positions for the cap 16, it is not necessary for the open position to be positive. In this case, the operator holds the cap 16 open during the coupling and uncoupling steps and the cap 16 rests against the coupled fluid conduits during fluid transfer. The biasing spring washer and the cam surface urge the cap 16 into a positive closed position once decoupled.

Figure 5:
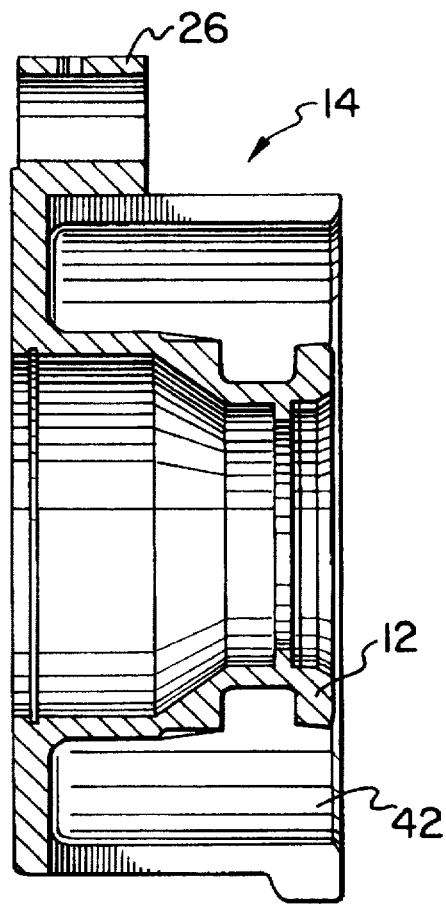
FIG. 5 is a cross-sectional view of the unitary structure of FIG. 4 along the A—A.
Figure 4:
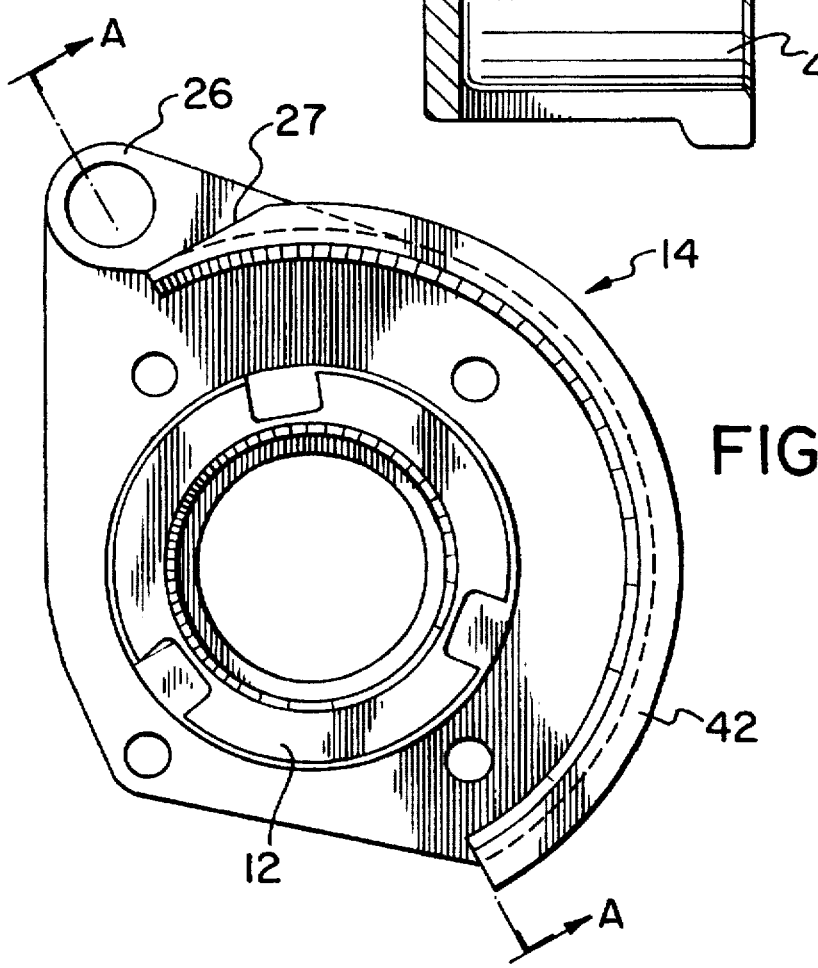
FIG. 4 is a top plan view of a unitary structure of the coupler and shield of FIG. 1.

Referring now to FIGS. 4 and 5, the shield 14 has a shroud 42 which extends around a portion of the shield 14. The coupler 12 is of a known construction, for example as described in U.S. Pat. No. 5,078,170. The cap and shield assembly of the present invention is particularly suited for protecting a coupler which is provided with a dry-break seal and valve (not depicted in the drawings). In FIGS. 4 and 5, the coupler 12 and the shield 14 are formed as a unitary structure adapted for subsequent attachment to a fluid conduit flange (not shown).

Figure 9:
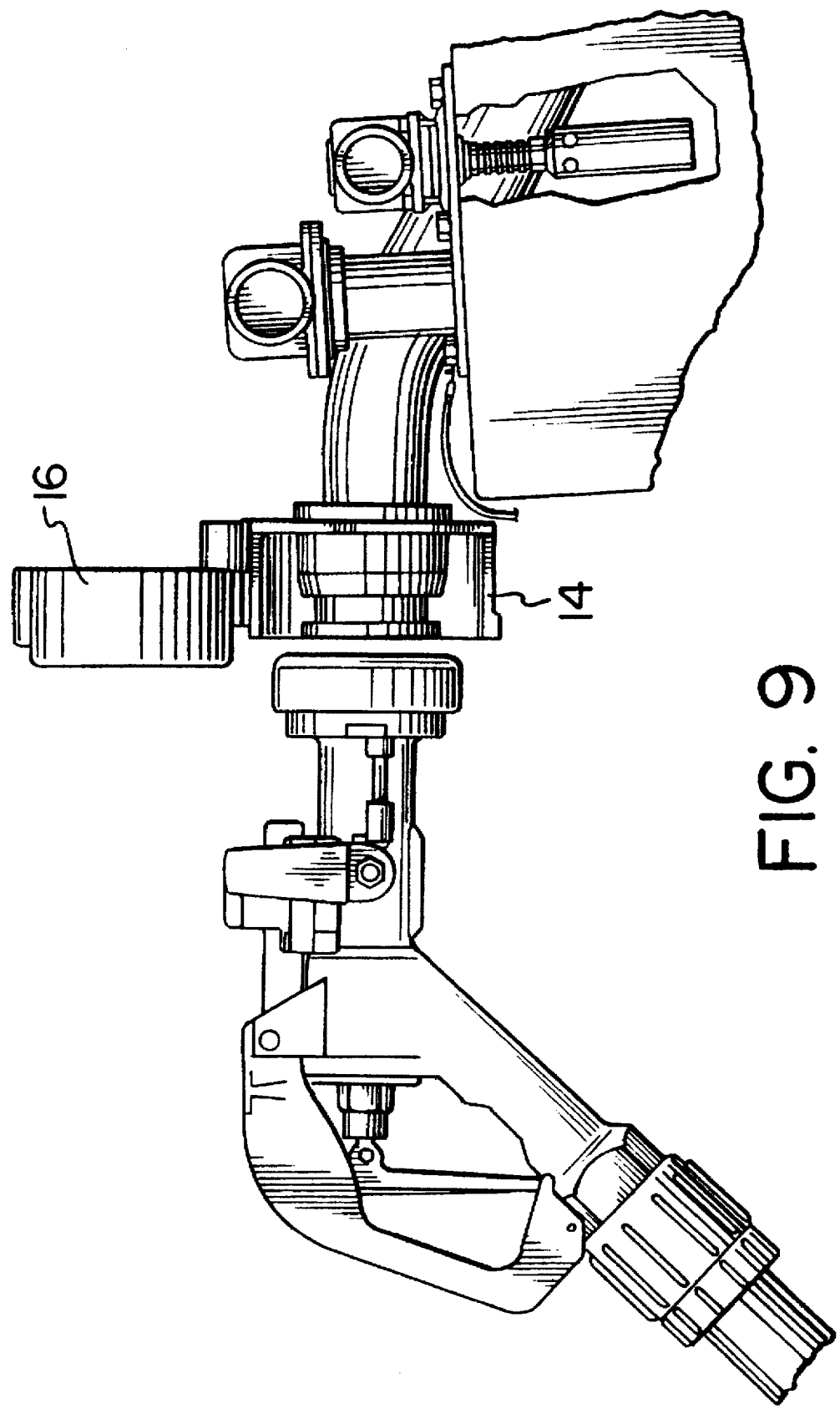
FIG. 9 is an illustration of an existing coupler adapted with the cap and shield assembly of the present invention.

However, it will be appreciated by those skilled in the art that the coupler 12 can be fastened to a separate shield 14 for subsequent attachment to a filler neck flange. It will therefore be appreciated by those skilled in the art that the cap and shield assembly 10 of the present invention could be supplied as a complete unit for new installations or as a kit for retrofit to an installed coupler, as illustrated in FIG. 9.

Figure 6:
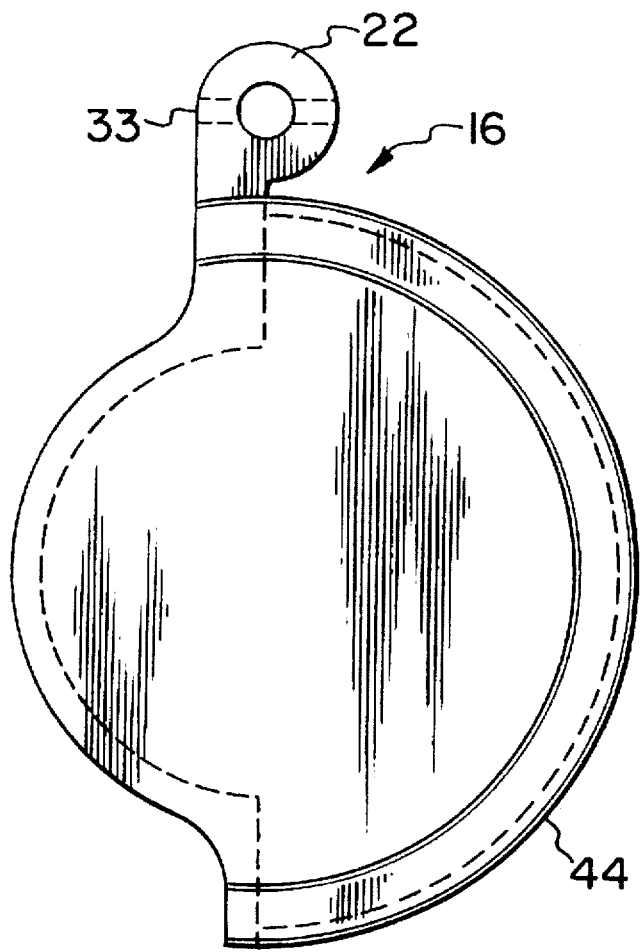
FIG. 6 is a top plan view of the cap of FIG. 1.
Figure 7:
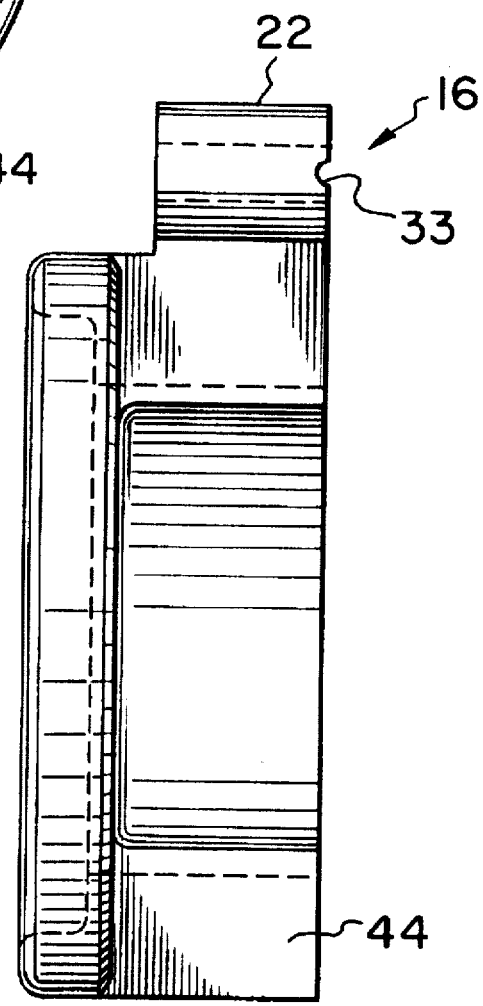
FIG. 7 is a side elevational view of the cap of FIG. 6.

Referring now to FIGS. 6 and 7, the cap 16 is provided with a shroud 44 which extends around a portion of the cap 16. When the cap 16 is in the closed position, the shroud 42 of the shield 14 and the shroud 44 of the cap 16 coact to protect the coupler 12 and in particular the coupler interface (not shown) from contamination by road/environmental debris.

While it is not necessary to provide a fluid-tight seal between the cap 16 and the shield 14 or the cap 16 and the coupler 12, it may be advantageous to provide such a seal to further protect the coupler interface from the environment. Such a seal may be effected, for example, with a gasket.

It may also be desirable to have the capability to lock the cap into position relative to the shield to protect the coupler and/or the fluid conduit or reservoir from tampering. This can be readily effected in the cap and shield assembly of the present invention in a conventional manner.

The cap and shield assembly is particularly suitable for mounting on the fuel tanks of fleet vehicles, such as buses and trucks, off-road vehicles, construction equipment, locomotive and marine vehicles. The cap and shield assembly may also be used to protect the interface of a fuel nozzle.

It will be apparent from reading this description of preferred embodiments that many modifications or alterations may be made without departing from the spirit and scope of the invention as defined in the following claims, which are meant also to encompass all equivalent forms of the invention as would be apparent to a person skilled in the art.

We claim:

1. A cap and shield assembly for a fluid conduit coupler, comprising:
   a shield and a cap hingedly connected to the shield, the shield and the cap being arranged such that when the cap is in a closed position, the fluid conduit coupler is protectively disposed therebetween, and when the cap is rotated from a closed position to an open position, the coupler is exposed; and
   cam means for positively retaining the cap in the open and closed positions and for moving the cap vertically away from the coupler and the shield when the cap is rotated from the positive closed position to the open position.

2. A cap and shield assembly according to claim 1, wherein the coupler and the shield are formed as a unitary structure.

3. A cap and shield assembly according to claim 1, wherein the cam means has a cam profile which also provides a positive open position for the cap relative to the shield.

4. A cap and shield assembly according to claim 3, wherein the positive open position of the cap is at an angle in the range of from about 90° to 180° relative to the positive closed position.

5. A cap and shield assembly according to claim 3, wherein the positive open position of the cap is at an angle in the range of from about 110° to 130° relative to the positive closed position.

6. A cap and shield assembly according to claim 3, wherein the positive open position of the cap is at an angle of about 120° relative to the positive closed position.

7. A cap and shield assembly according to claim 1, wherein the cam means is a cam bushing which coacts with a cam follower on a hinge shaft.

8. A cap and shield assembly according to claim 7, wherein the cam bushing is disposed in the shield.

9. A cap and shield assembly according to claim 7, wherein the cam bushing is disposed in the cap.

10. A cap and shield assembly according to claim 7, wherein the cam follower is a cross-pin which extends through the hinge shaft.

11. A cap and shield assembly according to claim 1, wherein the cap and the shield are provided with shrouds which coact in the closed position to protect the coupler.

12. A cap and shield assembly according to claim 1, further comprising means for providing a seal between the coupler and the cap.

13. A cap and shield assembly according to claim 1, further comprising means for providing a seal between the shield and the cap.

14. A kit for retrofit to a coupler for a fluid conduit, comprising:
   a shield and means for mounting the shield around the coupler;
   a cap hingedly connected to the shield, so as to arrange the shield and cap such that when the cap is in a closed position, the fluid conduit coupler is protectively disposed therebetween, and when the cap is rotated from a closed position to an open position, the coupler is exposed; and
   cam means for positively retaining the cap in the closed position and for moving the cap vertically away from the coupler and the shield when the cap is rotated from the positive closed position to the open position.

15. A kit according to claim 14, wherein the cam means has a cam profile which provides a positive open position for the cap relative to the shield.

16. A kit according to claim 15, wherein the positive open position of the cap is at an angle in the range of from about 90° to 180° relative to the positive closed position.

17. A kit according to claim 15, wherein the positive open position of the cap is at an angle in the range of from about 110° to 130° relative to the positive closed position.

18. A kit according to claim 15, wherein the positive open position of the cap is at an angle of about 120° relative to the positive closed position.

19. A kit according to claim 14, wherein the cam means is a cam bushing for coacting with a cam follower on a hinge shaft.

20. A kit according to claim 19, wherein the cam bushing disposed in the shield.

21. A kit according to claim 19, wherein the cam bushing is disposed in the cap.

22. A kit according to claim 19, wherein the cam follower is a cross-pin extending through the hinge shaft.

23. A kit according to claim 14, wherein the cap and the shield are provided with shrouds which coact in the closed position to protect the coupler.

24. A kit according to claim 14, further comprising means for providing a seal between the coupler and the cap.

25. A kit according to claim 14, further comprising means for providing a seal between the shield and the cap.

* * * * *